S. C. CARR.
AUTOMATIC CUT-OFF VALVE.
APPLICATION FILED FEB. 10, 1913. RENEWED APR. 20, 1917.

1,247,638. Patented Nov. 27, 1917.
2 SHEETS—SHEET 1.

UNITED STATES PATENT OFFICE.

SELBY C. CARR, OF OKLAHOMA, OKLAHOMA.

AUTOMATIC CUT-OFF VALVE.

1,247,638.   Specification of Letters Patent.   Patented Nov. 27, 1917.

Application filed February 10, 1913, Serial No. 747,403. Renewed April 20, 1917. Serial No. 163,506.

*To all whom it may concern:*

Be it known that I, SELBY C. CARR, a citizen of the United States of America, residing at Oklahoma city, in the county of Oklahoma and State of Oklahoma, have invented certain new and useful Improvements in Automatic Cut-Off Valves; and I do hereby declare that the following is a full, clear, and exact description of the invention, such as will enable others to make and use the same, reference being had to the accompanying drawings, forming a part of this specification.

This invention relates particularly to that class of cut-off valves which are employed as preventives to accidents, from low pressure of gas, when the gas pressure has been cut off or reduced to a degree below that necessary to support combustion at the burners, which conditions may arise from any fracture of the conductor pipe, from congealation of water in the pipe, leakage in the pipe, and cessation of flow of the gas from its source of supply, with the results as hereinafter indicated.

The invention is further designed for use in the gas service system, employing the prepayment meter, through which a limited supply of gas is furnished the consumer and between which meter and the burner the invention is installed in the conducting pipe thereby preventing danger from the escape of the gas upon the insertion of the proper meter opening check or coin and the resumption of the flow of the gas when, from any cause, the burner valves have not been previously closed.

The principal object of the invention is to provide a valve which will automatically close at a lower degree of pressure than has hitherto been effected, and in which the valve will still be positive in action and at the same time effect a perfect closing action of the valve.

A further object of the invention is to produce a valve which will automatically close, in case the gas has been cut off in the mains or is reduced to such an extent that combustion is not supported at the burners.

The invention further aims to provide an automatic cut off valve which may be installed in any position without impairing the effective operation thereof and which is so designed as to prevent any restriction to the flow of gas therethrough. A further object of the invention is to provide an automatic cut-off valve, the working parts of which will not be affected in any manner by the destructive constituents of the gas.

Another object of the invention is to produce a valve of the class described which may be manually closed in any emergency while the full pressure of gas is in the mains.

In the accompanying drawings.

Corresponding and like parts are referred to in the following description and indicated in all the views of the accompanying drawings by the same reference characters.

In the drawings, the numeral 15 indicates the valve casing including side walls 16 which extend downwardly in inwardly inclined planes and which are connected integrally with an outwardly curved bottom portion 17. The sides of the casing extend upwardly a considerable distance to form a dome 19, the upper surface of which is substantially flat and circular in form.

The valve casing is provided at its ends with pipe connections 20 and 21 provided with threaded openings 20ˣ and 21ˣ respectively, into which are fitted the threaded ends of the conducting pipes 22 and 24. Within the casing 15 there is formed a main chamber 25 which extends upwardly within the dome 19 and within this chamber 25 is formed a valve chamber 26, the top portion or wall 29 of which extends horizontally from the line of the inner surface of that end of the casing which is provided with the pipe connection 21 in the direction of the inner surface of the other end of the casing and to a point a short distance past a vertical line extending through the casing intermediate its ends. The sides 30 of the valve chamber 26 are outwardly bulged and the chamber at its inner end is provided with a circular opening 31 within which opening is formed a tapered valve seat 32.

Figures 8, 9, 10, 11:
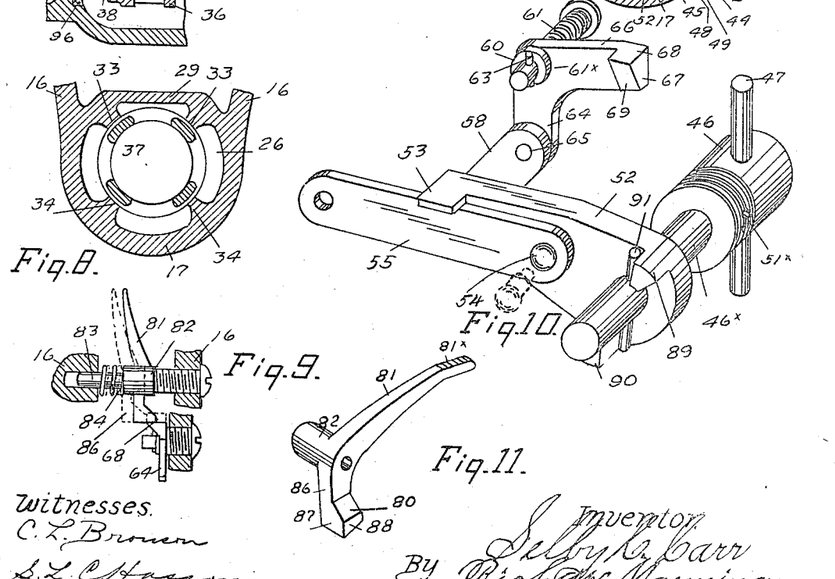
Fig. 8 is a detail vertical sectional view taken on the line $i$—$i$ of Fig. 2.
Fig. 9 is a detail vertical sectional view, illustrating the lever arm which is connected with the diaphragm, the positions assumed by the said arm being shown in full and dotted lines.
Fig. 10 is a detail perspective view of the manually operable valve setting shaft and arm and the lever devices associated therewith.
Fig. 11 is a detail perspective view of the lever arm which is connected with the diaphragm.

Extending inwardly from the inner surface of the top 29 of the valve chamber are valve guiding flanges 33 which, as shown, extend longitudinally from adjacent the line of the inner portion of the valve seat 32 to the line of the threaded opening in the pipe connection 21. Similar longitudinal flanges 34 extend from the inner surface of the bottom portion 17 of the casing, as shown in Fig. 8, these flanges extending in like manner from the inner portion of the valve casing to the line of the threaded opening in the pipe connection 21. The inner surfaces of the flanges 33 and 34, in the transverse direction of the casing and valve chamber, are upon the line of a true circle and are smoothly finished to provide for free sliding movement of the valve.

Figures 1, 6, 7, 12, 13:
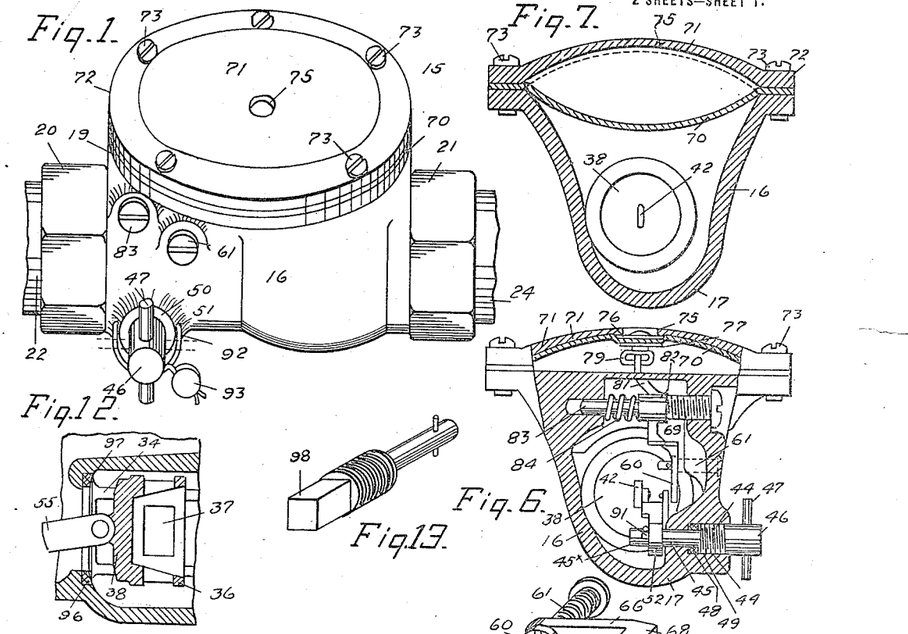
Figure 1 is a perspective view of the automatic cut off valve, looking at that side thereof at which the manually operable valve setting device is located.
Fig. 6 is a vertical transverse sectional view on the line $y$—$y$ of Fig. 3.
Fig. 7 is a vertical transverse sectional view on the line $z$—$z$ of Fig. 2.
Fig. 12 is a fragmentary sectional view, illustrating a slightly modified form of valve seat.
Fig. 13 is a detail perspective view of a modified form of the manually operable valve setting shaft.
Figure 3:
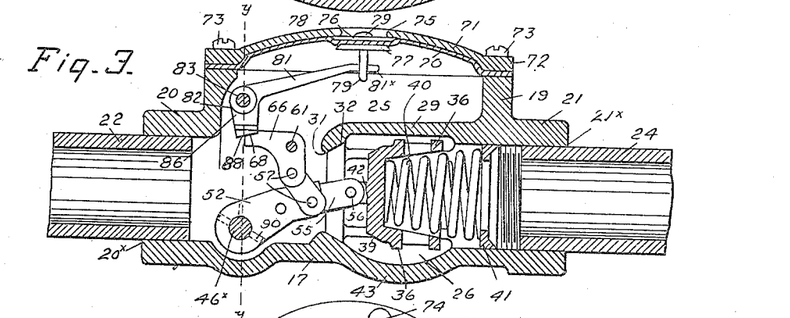
Fig. 3 is a similar view, illustrating the positions of the parts when the valve is opened.
Figure 4:
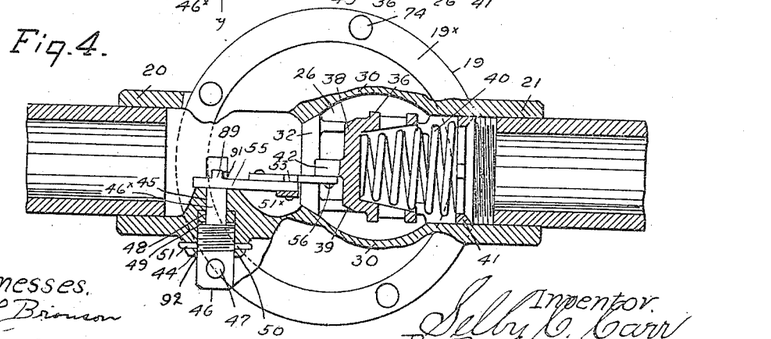
Fig. 4 is a horizontal sectional view through the valve, parts being broken away.
Figure 5:
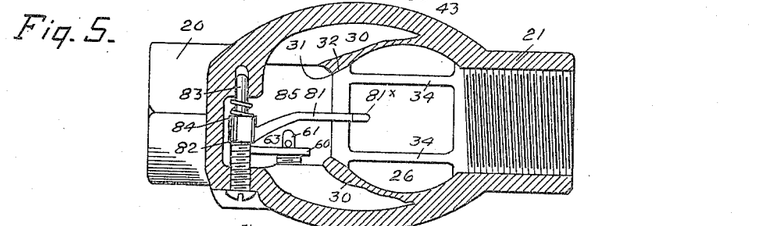
Fig. 5 is a horizontal sectional view through the valve substantially on the line X—X of Fig. 2, the upper portion of the valve chamber being broken away.

Within the valve chamber 26 is mounted the cut-off valve, indicated by the numeral 28. This valve consists of a hollow casting having an inner bell-shaped extension upon the outer surfaces of which valve and extension are rings 36 which are in sliding contact with the smooth surfaces of the guiding flanges 33 and 34. In the sides of the casting and the bell-shaped extension of the valve 38, between the rings 36, are transverse openings 37 for the passage of the fluid. The head of the valve is solid and its outer surface is beveled as at 39, to fit with exactness in the valve seat 32. The valve casting is interiorly flared from the plane of the inner surface of the head of the valve 38. The numeral 40 indicates the valve closing spring, the coils of which are contracted at one end to fit within the flared interior of the valve extension. The other end of the spring bears against an externally screw threaded ring which is inserted within the screw threaded opening of the pipe connection 21 and which is provided with lugs upon its inner periphery for the engagement of a suitable tool employed for the purpose of adjusting the ring within the pipe extension 21 whereby to vary the tension of the spring. Upon the outer surface of the head of the valve 38 is a lug 42, the purpose of which will be presently explained. The bottom of the valve chamber 26 is slightly dished at 43 to enlarge the gas passage around the valve, as shown in Fig. 3. An opening 44 is formed through the lower side portion of the casing 15 adjacent to the opening in the pipe connection 20 and a slight distance above the line of the inner surface of the bottom 17. In line with this opening, the inner surface of the wall is increased in thickness, as shown in Figs. 4 to 6, and the inner end of the opening is reduced in diameter, as indicated at 45. The wall of the opening at its outer end is screw threaded and within the said screw threaded portion of the opening is fitted the externally screw threaded outer end of a shaft 46 provided with an operating pin 47 or any other suitable handle member, whereby the shaft may be turned. The reduced inner end 46 of the shaft extends within the reduced portion 45 of the opening 44 and a short distance within the casing. In reducing the opening 44, a shoulder is formed and disposed within the opening and resting against the shoulder is a packing 48, a washer 49 being also arranged within the opening and against the packing. The shoulder formed by reducing the shaft between its ends, bears against the washer 49 and compresses the packing 48 making a perfect gas-tight closure around the portion 46ˣ of the shaft. The washer 49 may be rough on the side contiguous the packing so as to be held against rotation with respect to the packing upon turning of the shaft.

Upon the outer surface of the side of the casing 15 and extending around the outer portion of the shaft 46 is a boss 50 formed with openings 51 which register with the opening 51ˣ extending through the shaft 46.

Upon the projecting inner end portion 46ˣ of the shaft 46, is loosely mounted the inner end portion of a crank arm 52, the outer end portion of which arm extends in the direction of the opening 31, and at an angle to the inner end portion of the arm. A lug 53 is formed upon one side of the arm 52 at the outer end and upper edge thereof, and projects laterally from the said side of the arm. To the said side of the arm 52 at a point adjacent the line of the bend therein, is pivoted the inner end of a straight connecting bar 55, the upper surface and the outer end of which bar extends beneath the lug 53. The pivot pin 54 for the inner end of the bar 55, and certain other pivot pins to be hereinafter mentioned, is preferably made with a reduced inner end, as shown in Fig. 10, to enable the same to be secured tightly and yet allow the levers to turn upon the pivots without binding and with the least friction possible. The outer end of the connecting bar 55 extends to the side of the lug 42 on the head of the valve 38 and is pivotally connected therewith by a pivot pin 56.

With the opposite side of the crank arm 52, to that at which the lug 53 is located and to the outer end of the said arm, is connected, by means of a pivot pin 57, one end of a short link 58, which extends in an upward direction and is pivoted at its other end to one arm 64 of a bell-crank lever 60, which is supported by and rocks upon a pivot 61 which is secured through the side 16 of the casing and at a point approximately on a line extending horizontally through the upper portions of the openings in the pipe connections 20 and 21 and in a direction transversely of the casing 15, a short distance outwardly from the valve opening 31 in the valve casing. The inner end of the bolt, upon which the bell-crank lever is mounted, is reduced in circumference and a pin 63 confines the lever relatively close to the shoulder thus formed on the bolt. The other arm 66 of the bell-crank lever extends in the direction of that end of the casing 15 at which the pipe connection 20 is located and upon its outer end and upon the same side of the bell-crank lever to which the link 58 is connected, there is provided a double beveled cam 67. The upper portion of this cam and the extreme end of the arm 66 are inclined downwardly to a slight degree with respect to the upper edge of the arm 66, as shown in Fig. 10, forming a beveled cam surface 68. The inner side of the cam 67 is also inclined inwardly and downwardly at an oblique angle to the side of the arm 66, as at 69, the bevel 69 on the arm 66 of the bell-crank lever being hereinafter designated as a primary bevel and the bevel 68 as a secondary bevel, for a purpose which will be presently explained.

The numeral 70 indicates the collapsible diaphragm which is preferably composed of flexible material, impervious to the passage of gas, and also capable of resisting the destructive constituents thereof, and this diaphragm may be of leather, or of thin flexible metal, or a combination of both, the leather or like material being treated with a preservative, such as neat-foot oil, that will keep the diaphragm soft and pliable and prevent injury thereto from the destructive constituents of the gas. This diaphragm is circular in form and its peripheral portion is disposed upon the upper surface $19^\times$ of the dome, the main portion bulging and extending within the chamber 25 of the casing 15. Upon the upper portion of the dome is secured a cap 71, the outer portion 72 of which is considerably thicker than the central portion and rests upon the peripheral portion of the diaphragm. Through the said portion 72 of the cap and the peripheral portion of the diaphragm are secured bolts 73 which extend also through the threaded openings 74 in the dome 19, as shown in Fig. 4, for the purpose of securing said cap firmly to the diaphragm and the dome 19 and thereby preventing leakage of the fluid past the diaphragm. The central portion of the cap 17 is bulged outwardly and formed with an opening 75, the purpose of which will be presently explained.

At the central portion of the diaphragm 70 and upon the upper and lower surfaces thereof, are disposed small circular retaining disks 76 and 77, respectively, through which and the intermediate portion of the diaphragm extends a shank 78 having a head 79 which bears upon the upper surface of the disk 76, the lower end of the shank 78 being provided with an elongated loop 79.

Beneath the diaphragm is a diaphragm controller which consists of a lever arm 81 which acts, in conjunction with the diaphragm, and the inner end portion of this arm is rigidly connected with a hub 82 slidably mounted upon a supporting bolt 83 which extends through one side 16 of the casing and into the other side of the casing upon a line extending horizontally through the dome 19. The outer portion of the bolt 83 is screw threaded and is fitted in a threaded opening in one side of the casing, the inner end of the bolt which supports the hub 82 being reduced in circumference. Arranged upon the bolt, between the hub 82 and the inner surface of the casing, is a coiled spring 84, one end of which spring bears against the inner surface of the side of the casing and the other end against the inner end portion of the hub, the tendency of the spring being to move the hub in the direction of the bell-crank lever 60. The arm 81 extends from the inner end of the hub laterally to a point approximately in a vertical line extending through the central portion of the casing 15 and is thence extended in the direction of the loop 79 upon the under side of the diaphragm, the outer portion $81^\times$ of the diaphragm being bent slightly downward at an angle to the line of the upper surface of the arm and projecting into said loop. It will be observed that, inasmuch as the loop 79 is elongated, the end $81^\times$ of the arm may have a movement therein corresponding to the sliding movement of the hub 82 upon the bolt 83.

A short arm 86 extends downwardly from the lower portion of the hub 82 at an obtuse angle to the arm 81 and this arm 86 is in the path of movement of the arm 66 of the bell crank lever 60. The lower end of the arm 86 is formed with a cam 87 having double beveled surfaces thereon and hereinafter designated as primary and secondary bevels, the primary bevel, indicated at 80, being formed upon that side of the arm 86 which is presented toward the arm 66 of the bell-crank lever and presenting an upwardly and inwardly inclined surface. The secondary bevel, indicated at 88, is formed upon the lower portion of the cam 87 and presents a surface inclined inwardly and upwardly from the outer edge of the cam in the direction of the outer end of the arm 81. The angle of inclination of the cam surface 86 or secondary bevel is of approximately the same degree as the bevel 68 or secondary bevel of the cam 67, and in a like manner, the angle of inclination of the bevel 80 or primary bevel of the cam 87 is approximately of the same degree as the angle of inclination of the bevel 69 or primary bevel of the cam 67.

The arm 52 at its pivoted end is formed with lugs 89 and 90, the sides of which lugs are radial to the axis of the shaft 46. Through the portion 46ˣ of the shaft is fitted a pin 91 which has its ends projecting between the lugs.

Figure 2:
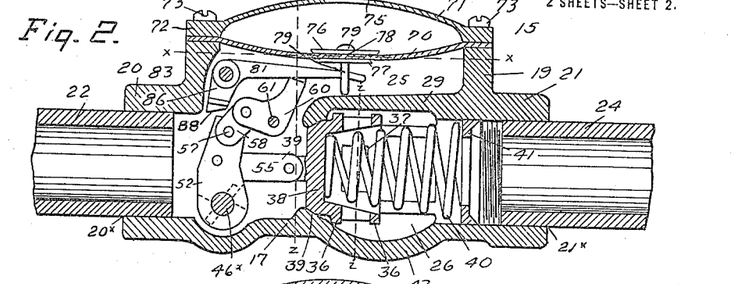
Fig. 2 is a vertical longitudinal sectional view through the valve, showing the parts in the position they assume when the valve is closed.

The spring 40, which actuates the valve 38, is given a predetermined tension, of such a degree as to close the valve 38 when the degree of pressure of the gas is below that necessary to support combustion at the burners. The spring 40 resting against the valve 38 tends to close the valve and serves to hold the same firmly to its seat while in closed position, and this spring is given sufficient tension to prevent any leakage of the fluid past the valve 38. With the valve 38 in open position, the spring 40 bearing against the head of the valve, exerts pressure against the link 55 and the other elements comprising the compound lever system, and, due to the peculiar arrangement of the lever system, the arm 81 exerts a pull in an inward direction upon the diaphragm which is resisted by the fluid pressure within the valve casing. It will be understood, by reference to the drawings and the foregoing description, that the compound lever system diminishes the force of the spring acting upon the diaphragm so that the inward pull upon the diaphragm is much less than the pressure exerted by the spring against the valve, thereby permitting a very low degree of fluid pressure within the casing to hold the diaphragm in the position shown in Fig. 3, with the consequence that the valve will be retained in open position until the degree of pressure of the fluid within the casing is greatly reduced, and, in fact, to such extent as not to support combustion at the burners. The valve is shown in Fig. 2 in closed position against the seat 39, the diagram 70 being in its lowered position or collapsed, and the bell-crank lever 60 being disengaged from the arm 86 on the shaft 83. Consequently, no gas is permitted to flow past the valve 38 which is held closed by the tension of the spring 40. In order to place the valve checking parts of the structure in operative position for automatic actuation, and to permit the gas to flow through the pipes to the burners, the shaft 46 is grasped and by the aid of the pin 47 is given a turn approximately in a quarter of a circle, thereby moving the pin 91 from the position shown in dotted lines in Fig. 2 to the position shown in dotted lines in Fig. 3, the pin moving at the same time into the dotted position shown in Fig. 1. The rotative movement of the shaft 46 is now reversed, thereby bringing the pins 91 and 46 into their normal positions, as shown in full lines in Figs. 1 and 10.

In turning the shaft 46 in the direction of the valve 48, the pin 91 is caused to bear against the lugs 89 and 90, thus moving the outer end of the crank arm 52 toward said valve until the lug 53 comes into contact with the upper surface of the connecting bar 55, as shown in Fig. 10. The valve 38 is now in full open position, the lug 53 acting as a stop for the levers, and preventing the pivoted inner end of the connecting bar 55 from passing a dead center, or, in other words, from passing a straight line drawn from the axis of the shaft 46 to the axis of the pivot 56 and also preventing the link 58 and the end of the bell-crank lever 60 connected thereto, from passing a like dead center.

In reversing the shaft 46, after opening the valve, the pin 91 is moved from the position shown in Fig. 3 to the position shown in Fig. 10, or, in other words, so that its projecting ends will contact with the other sides of the lugs 89 and 90. With the pin in this position, the crank arm 52 may move independently of the shaft 46 when swung backwardly by the movement of the link 55 in the closing action of the valve 38, thereby preventing the friction and resistance that would otherwise be offered to the movement of the levers if the crank arms were arranged to rotate with the shaft in the closing movement of the valve.

In this movement of the shaft 46, the connecting bar 55 is given a slight thrust and opens the valve 38, permitting the flow of the gas from the chamber 26 past the said valve and into the chamber 25, and the pressure of the gas forces the diaphragm 70 outwardly and into the concavity of the cap 71, at the same time drawing the outer end of the lever arm 81 in the corresponding direction and thereby moving the arm 86 into the position shown in Fig. 3.

In the movement of the shaft 46 in the direction to open the valve and in the action of the crank arm 52 and link 55 to cause such opening movement, the link 58 is pulled down, thereby throwing the arm 66 of the bell-crank lever 60 in the direction of the arm 86, the primary bevel 69 of the cam 67 riding against the primary bevel 80 of the cam 87 upon the arm 86 and moving the hub 82 upon the bolt 83 against the tension of the spring 84, thereby permitting the primary bevel 69 of the cam 67 to pass the primary bevel 80 of the cam 87, the return movement of the hub 82, due to the action of the spring 87, resulting in the secondary bevel 88 of the cam 87 being brought into position to engage with the secondary bevel 68 of the cam 67 immediately prior to the engagement of the lug 53 with the connecting bar 55, and the action of the cams serving to hold the arm 66 of the bell-crank lever 60 engaged with the arm 86 as shown in Fig. 3, whereby to hold the valve 38 in open position against the tension of the spring 40 under normal fluid pressure.

When the levers are in position to hold the valve in open position, the force exerted by the spring 40 against the valve 38 and connecting levers, has a tendency, due to the arrangement and coöperation of the secondary cams, to force these cams apart and move the cam 87 and the arm 86 outwardly, and the end 81$^x$ of the lever arm 81 inwardly, whereby an inward pull will be exerted upon the diaphragm 70 in opposition to the force exerted against the diaphragm by the pressure of the fluid. From the foregoing, it is obvious that the pull exerted by the end 81$^x$ of the lever 81 and the diaphragm 70, by the force of the spring 40, is dependent upon the degree of tension given this spring and, consequently the increasing or decreasing of the tension of the spring will cause the valve releasing and valve closing mechanism to act at correspondingly higher or lower degrees of fluid pressure, and, as previously stated, the inward pull exerted upon the diaphragm 70 through the action of the spring 40 and the compound system of levers, is much less than the total force exerted by the spring against the valve, it being understood that the tension of the spring 40 is so adjusted as to permit it to operate the valve releasing mechanism to close the valve upon a decrease in degree of pressure of the fluid within the casing to a point that will not support combustion at the burners to which the delivery pipe from the valve is connected.

The valve operating spring 40 is given a predetermined tension greater than the force of the pressure exerted by the gas against the diaphragm, and while the predetermined pressure of the spring against the valve is considerably greater than the force of the normal gas pressure against the diaphragm, the valve 35 will still be retained in open position, due to the system of compound levers. However, the cutting off of the gas supply in the mains, or a reduction in the pressure to a degree which will not support combustion at the burners, will cause the spring 40 to overbalance the force of the pressure of the gas against the diaphragm 70, thereby drawing down the said diaphragm with the lever arm 81 by the combined action of the cams 67 and 87, as previously described, and disengaging the secondary bevels 68 and 79 and releasing the lever mechanism, thereby releasing the spring 40 to move the valve to closed position and preventing any further flow of gas past the valve until manually opened by rotating the shaft 36.

From the foregoing it will be seen that the releasing force exerted by the cam 67 of the bell-crank lever 60, in the expansion of the spring 40, to close the valve 38 and the movement outwardly of the arm 66 to assume the position shown in Fig. 2 is caused by the yielding action of the secondary bevels 68 and 78, which serve to force the cams 67 and 87 apart and release the valve checking levers, and through the arm 81 acting to pull the diaphragm inwardly to collapsed position, the diaphragm remaining in such position, and, as shown in Fig. 2, until the shaft 46 is again operated to set the valve 38 or, in other words, to move the same to open position. Should at any time the manual closing of the valve be desired for any purpose with normal fluid pressure within the casing, such for example, as for the removal of a burner from the gas delivery pipe, any suitable instrument may be inserted through the opening 75 and inward pressure exerted against the diaphragm whereby to collapse the same, whereupon the end 81$^x$ of the lever 81 will be moved downwardly and the cams 67 and 87 will be disengaged and the levers being released, the valve 38 will be moved to closed position, preventing the passage of gas past the valve, as before described.

Should the shaft 46, and consequently the pin 91 carried thereby, be accidentally rotated from the position shown in Fig. 10 to or toward the position shown in Fig. 3, while the valve is in open position, the lugs 89 and 90 would contact with the pin in the closing movement of the valve and the consequent movement of the crank arm 52. This would necessitate the crank arm revolving the shaft 46 and, owing to the friction offered to the rotation of the shaft 46, by reason of its packing, the valve 38 would be checked to a certain extent in its closing movement, which would in all likelihood prevent the valve from closing tightly thereby resulting in leakage past the valve upon the resumption of the flow of fuel into the valve casing. In order to prevent this accidental rotation of the shaft 46 from its reversed position after the opening of the valve, a wire 92 is passed through the registering openings 51 and 51× and the ends of the wire are secured by a lead seal or the like.

In adjusting the tension of the spring 40, the ring 41 is rotated to adjust it in the pipe connection 21, causing it to bear more or less firmly against the larger coils of the spring 40, in order to provide for the automatic closing of the valve upon a reduction of the gas pressure to a predetermined degree, the design of the valve throughout being such as to prevent any restriction to the flow of the fluid therethrough.

The opening 75 in the cap 71 serves not only to permit of the introduction of a suitable instrument for the purpose of closing the valve, by pressing inwardly upon the diaphragm, but it also permits of the introduction into the dome of the casing of a preserving fluid for the diaphragm, while the diaphragm is in collapsed position. Instead of the form of valve seat shown in the principal figures of the drawings, I may employ a seat, such as shown in Fig. 12, in which the valve chamber is provided with a groove 96 in which is removably fitted a seating ring 97 which constitutes the valve seat proper and which, upon removal, may be ground to secure an accurate fitting of the valve to its seat.

The outer end of the shaft 45, instead of being manually operated by hand, as before described, may be provided with shoulders 98, as shown in Fig. 13, for the application of a key wrench, or any other suitable tool for the purpose stated.

From the foregoing description of the invention, it will be apparent that due to the provision of the compound system of levers, arranged between the valve and diaphragm, a spring of maximum tension may be employed to firmly close the valve and yet a minimum pulling force will be exerted upon the diaphragm opposing the pressure of fluid within the valve casing, so that the mechanism is extremely sensitive and positive in its movement and yet a forceful and firm closing and seating of the valve is provided for. Furthermore, due to the system of levers, the valve will be retained in open position with a lower degree of fluid pressure than would be possible if the forces acting upon the valve and the diaphragm were equal or nearly equal. It will furthermore be apparent that no obstruction is offered to the free passage of the fluid through the valve casing and past the valve.

Furthermore, it will be noted that the diaphragm may be readily removed whenever desired without in any way disarranging the pipe connections with the valve casing.

Having fully described my invention, what I now claim as new and desire to secure by Letters Patent is:

1. In an automatic cut off valve of the class described, a casing having an inlet and an outlet, a valve in the casing, means acting with pressure directly against one side of the valve tending to move the same to closed position, and means acting with pressure directly against the other side of the valve to yieldably resist closing movement of the valve, the last mentioned means being operative in the presence of fluid in the casing under a predetermined minimum degree of pressure and being arranged to be rendered inactive upon decrease in pressure below the minimum degree.

2. In an automatic cut off valve of the class described, a casing having an inlet and an outlet, a valve within the casing, means operating against one side of the valve for holding the valve in open position, pressure controlled means arranged upon a predetermined variation in the degree of pressure in the casing to render the first-mentioned means inactive, and means exerting pressure against the other side of the valve toward closing position and acting through the medium of the valve upon the pressure controlled means in a manner tending to actuate the same to render the first-mentioned means inactive.

3. In an automatic cut off valve of the class described, a casing having an inlet and an outlet, a valve within the casing, a pressure controlled element, means exerting pressure against one side of the valve toward closing position, and means operating against the other side of the valve and arranged to hold the valve in open position and operable to release the valve and arranged in one position of the valve to act upon the pressure controlled element with a degree of force less than that exerted by the valve closing means against the valve with a tendency to actuate the same to render inactive the means for holding the valve in open position.

4. In an automatic cut off valve of the class described, a casing having an inlet and an outlet, a valve within the casing, means tending to close the valve, jointed elements operating against one side of the valve and arranged when in one position and substantially in alinement to receive the thrust of the valve and thereby hold the valve in open position, and a pressure controlled element operable upon a predetermined variation in the degree of pressure within the casing to cause the said elements to break joint.

5. In an automatic cut off valve of the class described, a casing having an inlet and an outlet, a valve within the casing, means acting against the valve to move the same to closed position, jointed elements operating against one face of the valve and arranged when in one position and substantially in alinement to receive the thrust of the valve, a pressure controlled element, and connection between the said jointed elements and the pressure controlled element arranged in the open position of the valve to transmit the thrust of the valve in reduced degree to the said pressure controlled element in opposition to the fluid pressure exerted thereagainst and upon a predetermined variation in the degree of pressure to actuate the said jointed elements to cause the same to break joint.

6. In an automatic cut off valve of the class described, a casing having an inlet and an outlet, a valve within the casing, means operating against one face of the valve and tending to close the valve, a collapsible member operating against the other face of the valve and arranged to receive the thrust of the valve when the valve is in open position and thereby restrain the valve against movement to closed position, the thrust of the valve tending to collapse the said member, a pressure controlled element, and connection between the said element and the said member arranged in the open position of the valve to transmit the thrust of the valve with a reduced degree of force to the said pressure controlled element in opposition to the fluid pressure exerted thereupon and upon a predetermined variation in the degree of pressure to collapse the member and render the said member inactive.

7. In an automatic cut off valve of the class described, a casing having an inlet and an outlet, a valve within the casing, means tending to close the valve, pivotally connected elements, one pivotally connected with the valve, the said elements being arranged when in one position to receive the thrust of the valve and thereby hold the valve in open position, the said elements in such position having their pivots in alinement and occupying a line at an angle to the axis of the valve, a pressure controlled element operable upon a predetermined variation in the degree of pressure within the casing to cause the said elements to break joint, and connection between the pressure controlled element and the first-mentioned elements for such operation and arranged to transmit the thrust of the valve in a reduced degree of force to the said pressure controlled element in opposition to the fluid pressure exerted thereagainst.

8. In an automatic cut off valve of the class described, a casing having an inlet and an outlet, a valve within the casing, means tending to close the valve, pivotally connected elements having their pivots in alinement when in one position to receive the thrust of the valve and thereby hold the valve in open position, a pressure controlled element, a rocking member having connection with the said elements, and a member connected with the pressure controlled element, the said last-mentioned members having coöperating cam portions relatively disengageable upon actuation of the pressure controlled element upon a predetermined variation in the degree of pressure in the said casing, whereby the pivots of the said pivotally connected elements are thrown out of line by the mutual disengagement of the said cam surfaces.

9. In an automatic cut off valve of the class described, a casing having an inlet and an outlet, a valve within the casing, means acting against the valve to move the same to closed position, an arm pivotally mounted within the casing, a member pivoted to the arm and to the valve, the said arm and member being arranged in the open position of the valve and when the pivots are in alinement to be in a line at an angle to the axis of the valve to receive the thrust of the valve and restrain the same against movement to closed position, a member mounted for rocking movement and having connection with the pressure controlled element, the pressure controlled element being operable upon a predetermined variation in the degree of pressure of the fluid within the casing to actuate the last-mentioned member to release the second-mentioned member and thereby permit the thrust of the valve to break the joint between the said arm and first-mentioned member.

10. In an automatic cut off valve of the class described, a casing having an inlet and an outlet, a valve within the casing, means acting against the valve to move the same to closed position, an arm pivotally mounted within the casing, a member pivoted to the arm and to the valve, the said arm and the member being arranged in the open position of the valve and when the pivots are in alinement and occupying a line at an angle to the axis of the valve to receive the thrust of the valve and restrain the same against movement to closed position, a member mounted for rocking movement and having connection with the said arm and first-mentioned member, a pressure controlled element, and a member arranged to coöperate with the last-mentioned member to restrain the same against movement, and having connection with the pressure controlled element, the pressure controlled element being operable upon a predetermined variation in the pressure of fluid within the casing to actuate the last-mentioned member to release the second-mentioned member and thereby permit thrust of the valve to break the joint between the said arm and first-mentioned member, the thrust of the valve being communicated in a reduced degree to the last mentioned member whereby to cause the said member to act upon the pressure controlled element in opposition to the fluid pressure acting thereagainst.

11. In an automatic cut off valve of the class described, a casing having an inlet and an outlet, a valve within the casing, means acting against the valve to move the same to closed position, an arm pivotally mounted within the casing, a member connected to the arm and to the valve, the said arm and member when in alinement being arranged to receive the thrust of the valve and thereby restrain the valve against movement to closed position, a member mounted for rocking movement and connected with the said arm and provided with a cam portion, a lever arm having a cam portion for coöperation with the cam portion of the rocking member, and a pressure controlled element having connection with the said lever arm, the thrust of the valve being transmitted in reduced degree to the said lever arm whereby to act upon the pressure controlled element in opposition to the fluid pressure acting thereagainst, the transmitted thrust causing the cam portion of the rocking member to bear against the cam portion of the lever arm and the said lever arm being arranged to be actuated by the movement of the pressure controlled element upon a variation in the degree of pressure within the casing to cause its cam portion to disengage from the cam portion of the rocking member whereby to permit the thrust of the valve to break the joint between the first-mentioned arm and first-mentioned member and thereby permit the valve to move to closed position.

12. In an automatic cut off valve of the class described, a casing having an inlet and an outlet, a valve within the casing, means tending to close the valve, a member arranged to receive the thrust of the valve when the valve is in open position and thereby restrain the valve from movement to closed position, a member mounted for rocking movement and connected with the first mentioned member and having primary and secondary bevels, a pressure controlled element, a member connected with the pressure controlled element and having primary and secondary bevels, the last-mentioned member being movable laterally with respect to the second-mentioned member, and means resisting such movement of the last-mentioned member, the second-mentioned member being arranged upon movement of the first-mentioned member to position to receive the thrust of the valve to bring the primary and secondary bevels respectively and successively into engagement with the primary and secondary bevels of the last-mentioned member and in the engagement of its primary bevel with the primary bevel of the last-mentioned member to shift the said member into position for coöperative engagement of the said secondary bevels.

13. In an automatic cut off valve of the class described, a casing having an inlet and an outlet, a valve within the casing, means acting to move the valve to closed position, a member located in the path of movement of the valve to closed position and arranged in the open position of the valve to receive the thrust of the valve, a pressure controlled element, a member arranged when moved in one direction to act upon the pressure controlled element in opposition to the force exerted thereagainst by the fluid pressure, and means operatively connected with the first-mentioned member and coöperating with the last-mentioned member to transmit the thrust of the valve in a reduced degree to the last-mentioned member in a manner tending to move the same in the direction stated, the last-mentioned member being arranged to be disengaged from and released by the second-mentioned member upon a predetermined variation in the degree of fluid pressure within the casing whereby to permit the full force of the thrust of the valve to act upon the first-mentioned member and thereby overbalance the same and render the same inactive to hold the valve in open position.

14. In an automatic cut off valve of the class described, a casing having an inlet and an outlet located in alinement, a valve within the casing between the inlet and outlet, an abutment member adjustable within the inlet, a spring bearing between the valve and the said abutment member, the adjustment of the abutment member serving to vary the tension of the spring, and means coacting with the valve to automatically close the same upon a predetermined variation in the degree of pressure within the casing.

15. In an automatic cut off valve of the class described, a casing having an inlet and an outlet, and provided interiorly with a valve chamber, a valve mounted within the chamber and comprising a head having a hollow extension, the valve chamber being of a diameter greater than that of the valve head, guides arranged within the valve chamber between which the valve is slidably movable, the extension of the valve having open sides, a spring bearing within the extension and acting to close the valve, and means operable to close the valve upon a predetermined variation in the degree of pressure within the casing.

16. In an automatic cut off valve of the class described, a casing having an inlet and an outlet, a valve within the casing, means acting to close the valve, said means comprising a spring bearing against the valve, means for adjusting the tension of the spring accessible through the inlet of the casing, and means arranged to automatically close the valve upon a predetermined variation in the degree of fluid pressure within the casing.

17. In an automatic cut off valve of the class described, a casing having an inlet and an outlet, a valve within the casing, means acting against the valve to close the same, a rotatable shaft extending within the casing, an arm loosely mounted upon the shaft, the arm being arranged when in one position to hold the valve in open position, a pressure controlled element having connection with the arm and arranged to render the same inactive upon a predetermined variation in the degree of fluid pressure within the casing, and coöperating elements upon the shaft and arm arranged to connect the arm for rotation with the shaft when the shaft is turned in one direction whereby to cause the arm to move the valve to open position, the shaft being rotatable in a reverse direction independently of the arm whereby movement of the arm to inactive position will be independently of the shaft.

18. In an automatic cut off valve of the class described, a casing having an inlet and an outlet, a valve arranged within the casing and removable through the inlet, a seat for the valve located opposite the inlet, guides extending between the inner end of the inlet and the said seat between which guides the valve is slidably movable, an abutment element adjustably mounted within the inlet, and a spring bearing between the said abutment element and the said valve.

19. In an automatic cut off valve of the class described, a casing having an inlet and an outlet, a valve arranged within the casing and removable through the inlet, a seat for the valve located opposite the inlet, guides extending between the inner end of the inlet and the said seat between which guides the valve is slidably movable, an abutment element adjustably mounted within the inlet, and a spring bearing between the said abutment element and the said valve, the valve comprising a head having an interiorly flared hollow extension provided in its sides with passages for the fluid and the spring having its coils at its end which coöperates with the valve contracted and fitting within the flared interior of the said extension.

20. In an automatic cut off valve of the class described, a valve casing having a valve chamber provided with a valve seat, the casing having an inlet and an outlet, and the inlet communicating with the said valve chamber, relatively narrow guides arranged within the chamber and extending from the seat to the inlet, a valve arranged within the chamber and having a head provided with a hollow extension, the said extension being formed with circumscribing ribs riding against the said guides, the inner end of the hollow extension being located in advance of the foremost rib, a valve closing spring having an end seating in the said extension and against the inner end wall thereof, means arranged to hold the valve in open position, and means arranged to render the last-mentioned means inactive upon a predetermined variation in the degree of pressure within the casing.

21. In an automatic cut-off valve for gas and other fluids under pressure, in combination with a casing having inlet and outlet passages for the fluid a valve within said casing, a manually-operable shaft, a crank arm loosely mounted on said shaft, a connecting arm pivotally connected therewith and with said valve, and means on said manually-operated rotative shaft co-acting with the crank arm to connect the arm for movement with the shaft in one direction of rotation of said shaft and arranged to permit independent reverse movement of said shaft.

22. In an automatic cut-off valve for gas and other fluids, in combination with a casing having inlet and outlet passages for the fluid, a valve, a manually-operable shaft, a crank arm loosely mounted thereon, a connecting bar pivotally connected therewith and with said valve, an abutment on said crank arm, and an abutment on said shaft arranged to coöperate with the first-mentioned abutment to move said crank arm in a direction to open the valve when the shaft is rotated in one direction and to be out of coöperative relation to the lugs in a reverse movement of the arm.

23. In an automatic cut-off valve for gas and other fluids under pressure, in combination with a casing having inlet and outlet passages for the fluid, a valve within the casing, a manually-operable shaft, a crank arm loosely mounted on said shaft and having an abutment thereon, a connecting bar pivotally connected with said crank arm and the said valve, an abutment carried by the shaft adapted to act conjointly with the abutment upon the arm in a movement of the shaft to open the valve and to be out of coöperative relation thereto in a reverse movement of said shaft, and means for limiting the pivotal movement of the said loosely mounted crank arm and connecting bar in the opening of the valve.

24. In automatic cut-off valves for gas and other fluids under pressure, in combination with a casing having inlet and outlet passages for the fluid, of a flexible diaphragm within the casing, and a valve controlling the passage of the fluid through the casing, a spring acting under a predetermined tension to close said valve, a diaphragm controller adapted to control the inward movement of the diaphragm against the fluid pressure and co-acting valve-opening and valve-checking mechanism in releasable engagement therewith and operable upon the diaphragm controller upon a decrease of the fluid pressure below the normal fluid pressure.

25. In an automatic cut-off valve for gas and other fluids under pressure, in combination with a casing having inlet and outlet passages for the fluid, a diaphragm, and a lever arm connected with the diaphragm, a cam upon the arm, a spring-controlled valve, a shaft, a crank arm loosely mounted on said shaft, an abutment upon the crank arm, an abutment upon said shaft arranged to contact with the abutment upon the crank arm in the operation of said rotatable shaft, a connecting bar connected with said loosely mounted crank arm and said valve, an angle lever, a link pivotally connected with one arm of the angle lever and said loosely-mounted crank arm, and a cam on the other arm of the angle lever adapted to coöperate with the cam upon the lever arm.

26. In an automatic cut-off valve for gas and other fluids under pressure, in combination with a casing having inlet and outlet passages for the fluid, of a fluid cut-off mechanism comprising a valve, a spring under a predetermined tension for closing the valve, a diaphragm, a bearing, a hub slidingly mounted thereon, a spring acting to communicate a yielding movement thereto, arms on said hub, one of which is connected at its free end with the diaphragm, and a cam upon the other arm, a manually-operable rotative shaft, a crank arm loosely mounted on said shaft and having an abutment, an abutment on said shaft adapted to coöperate with the first-mentioned abutment in the operation of said rotatable shaft, a connecting bar pivotally connected with the said loosely-mounted crank arm and with the said valve, a link pivotally connected with the crank arm, an angle lever having one arm pivotally connected with said link, and a cam upon the other arm of the angle lever adapted to co-act with the first-mentioned cam.

27. In the automatic cut-off valve for gas and other fluids under pressure, a casing having inlet and outlet passages for the fluid, a diaphragm within the casing, a fluid cut-off valve, a spring acting to close said valve, a rotative shaft, a crank arm loosely mounted on said shaft, a connecting bar pivotally connected with said crank arm and said valve, an abutment upon the crank arm, an abutment upon the shaft for coöperation with the first-mentioned abutment, a bearing within the casing, a hub slidingly mounted thereon, a spring bearing against said hub, arms on said hub, means connecting the free end of one of said arms with the diaphragm, and a cam upon the other arm having double beveled surfaces, an angle lever having a bearing within the casing, a link pivotally connected with one arm of the angle lever, and a cam upon the other arm of the angle lever having double beveled surfaces adapted to coöperate with the first-mentioned cam surfaces to draw inwardly upon the diaphragm against the fluid pressure.

28. An automatic cut-off valve for gas and other fluids under pressure, comprising a casing having a main chamber, and inlet and outlet passages for the fluid communicating therewith, a valve chamber within the main chamber in communication with the inlet opening to said main chamber, a valve in said valve chamber, and a spring acting under a predetermined degree of tension to close said valve, a manually-operable rotative shaft extending within the casing, a crank arm loosely mounted on said shaft, interlocking means on said crank arm and shaft for conjoint and independent rotative movement, a connecting bar pivotally connected with said loosely-mounted arm and with said valve, a link pivotally connected with the said crank arm, a diaphragm within the main chamber of the casing, a stationary bearing beneath said diaphragm, a hub slidingly mounted thereon, arms on said hub, means slidably connecting the free end of one of said arms with the diaphragm, and a cam upon the other arm, an angle lever, one arm of which lever is pivotally connected with the link on the said crank arm, and a cam upon the other arm arranged for coöperation with the cam on the arm on the slidable hub.

29. In an automatic cut-off valve for gas and other fluids under pressure, a casing having a main chamber, and inlet and outlet passages for the fluid therethrough, a valve chamber within the main chamber in communication with the inlet opening to the main chamber, a valve in the valve chamber, a spring adjustable to act under a predetermined degree of tension to close said valve, a manually-operable rotative shaft extending within said casing and said main chamber, a crank arm loosely mounted thereon, and interlocking connections on said arm and shaft for conjoint and independent movement, a connecting bar pivotally connected with the arm and with said valve, a link pivotally connected with said crank arm, a diaphragm, a bearing, a hub slidingly mounted thereon, a spring yieldably holding the hub in one direction, arms on said hub, and a loop on said diaphragm with which the free end of one of said arms is slidably engaged, the other arm having cam surfaces, an angle lever within the main chamber, one arm of which lever is pivotally connected with the link on the crank arm, the other arm of said angle lever having cam surfaces adapted to coöperate with the cam surfaces on the arm on the slidable hub and releasable upon the decrease of fluid pressure below the normal pressure within the said casing.

SELBY C. CARR.

Witnesses:
A. B. ROBERTS,
JOHN J. MOFFATT.

Copies of this patent may be obtained for five cents each, by addressing the "Commissioner of Patents, Washington, D. C."